United States Patent [19]

Smarook

[11] 3,919,381
[45] Nov. 11, 1975

[54] PROCESS FOR EXPANDING A THERMOFORMABLE PREFORM NETWORK CONFIGURATION

[75] Inventor: Walter H. Smarook, Somerville, N.J.

[73] Assignee: Union Carbide Corporation, New York, N.Y.

[22] Filed: Dec. 26, 1973

[21] Appl. No.: 427,494

Related U.S. Application Data

[63] Continuation-in-part of Ser. No. 213,296, Dec. 29, 1971, abandoned.

[52] U.S. Cl. ............... 264/164; 206/201; 206/427; 264/134; 264/259; 264/265; 264/338; 425/812; 428/116; 428/119
[51] Int. Cl.² .......................................... B29C 17/02
[58] Field of Search .......... 156/197, 228, 229, 247, 156/344; 264/41, 261, 164, 291, 134, 259, 265, 338; 425/812; 428/116, 119; 206/201, 427

[56] References Cited
UNITED STATES PATENTS

| | | | |
|---|---|---|---|
| 2,502,304 | 3/1950 | Baker | 264/41 X |
| 2,962,409 | 11/1960 | Ludlow et al. | 264/261 X |
| 3,277,535 | 10/1966 | Rupert | 425/812 UX |
| 3,367,760 | 2/1968 | Bendig et al. | 264/291 X |

FOREIGN PATENTS OR APPLICATIONS

| | | | |
|---|---|---|---|
| 47-46782 | 11/1972 | Japan | 264/164 |
| 1,015,330 | 12/1965 | United Kingdom | 264/164 |

OTHER PUBLICATIONS

McLaren, A. D.; T. T. Li; Robert Rager; and H. Mark, "Adhesion, IV, The Meaning of Tack Temperature," In Journal of Polymer Science Vol. VII, No. 5, pages 463-471 (1951).

Sharpe, Louis H. and Harold Schonhorn, "Surface Energetics, Adhesion, and Adhesive Joints," In Contact Angle, Wettability, and Adhesion. The Kendall Award Symposium Honoring William A. Zisman sponsed by the Div. of Colloid and Surface Chemistry at the 144th meeting of the American Chemical Society, Los Angeles, Calif. Apr. 2-3, 1963. Washington, D.C., American Chem. Soc. 1964 (Advances in Chemistry Series 43), pp. 189-201.

*Primary Examiner*—Philip Anderson
*Attorney, Agent, or Firm*—J. J. O'Connell

[57] ABSTRACT

The cross-sectional configuration of netting made from fusible plastic materials is expanded by fusing the netting between a pair of platens having surfaces that are wet by the fused material, and then pulling the platens apart a predetermined distance to expand the cross-sectional area of the fused material which adheres to the platens.

20 Claims, 18 Drawing Figures

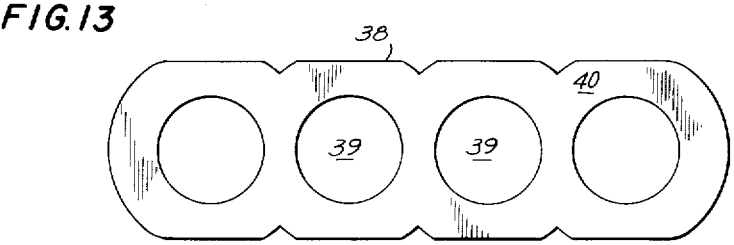
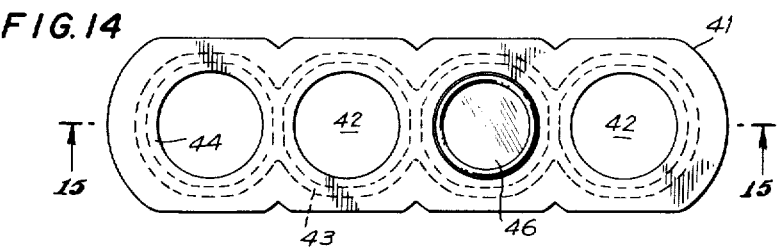
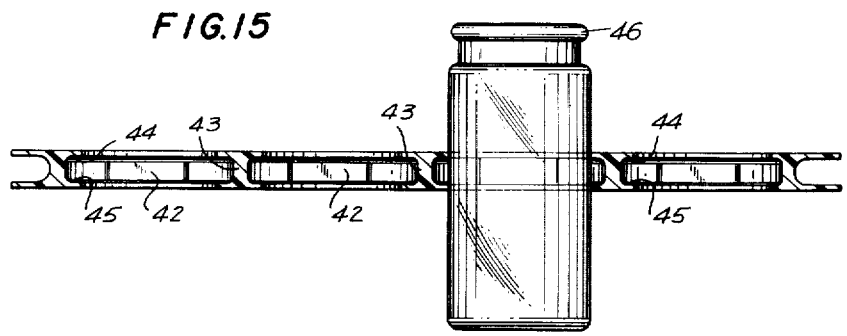

PROCESS FOR EXPANDING A THERMOFORMABLE PREFORM NETWORK CONFIGURATION

CROSS-REFERENCES TO RELATED PATENT APPLICATION

This patent application is a continuation-in-part of patent application Ser. No. 213,296 filed Dec. 29, 1971, now abandoned.

BACKGROUND OF THE INVENTION

1. Field of the Invention

The invention relates to the art of making lightweight plastic objects having a net-like configuration.

2. DESCRIPTION OF THE PRIOR ART

Plastic netting is used for a variety of applications. The netting is a net-like fabric in which the individual strands (threads, or filaments, etc.) intersect each other, and primarily in diagonal directions. The netting may be made by various procedures as disclosed in U.S. Pat. Nos. 3,365,352; 3,140,330; 3,222,440 and 3,242,023 and Great Britain patent specification No. 836,555.

Although the individual strands, or the entire netting structures, may be stretched in one or both of the directions which are horizontal to the plane of the strands or netting for purposes such as orienting the strands or the netting, the physical configuration and cross-sectional geometry of the individual strands is usually determined by the shape of the aperture of the spinning, or other, device from which the strands were made or spun. Thus, the thickness of the netting is largely determined by the thickness of the individual strands as they are initially made or spun. This limitation on the thickness of the netting results in limitations on the utility of the netting, since various physical properties of the netting such as flexibility, resilience and shock absorbance are directly related to the thickness of the netting.

SUMMARY OF THE INVENTION

The thickness of netting made from a fusible material is expanded to increase the cross-sectional area of the netting by fusing the netting between a pair of heated platens, which platens are wetted by the fused netting, and then stretching the netting in its cross-sectional direction so as to increase the cross-sectional area formed by the netting, by pulling the platens apart with the netting adhering thereto.

An object of the present invention is to provide a process whereby plastic netting may have its bulk cross-sectional area readily increased.

Another object of the present invention is to provide a process whereby plastic netting may have an increased cross-sectional bulk area and wherein the individual expanded strands of the netting are provided with flanged surfaces and relatively narrow cross-sectional areas or configurations.

Another object of the present invention is to provide a process whereby the bulk cross-sectional area of plastic netting may be readily increased to various degrees to accommodate various end use applications.

DESCRIPTION OF THE PREFERRED EMBODIMENT

DEFINITIONS

With respect to the herein provided description, examples and claims relating to the present invention the following definitions apply:

"Thermoformable" means that the thereby described material is a solid at 25°C. which can be reshaped or reformed above some higher temperature. "Thermoplastic" means that the thereby described material is a solid at 25°C. which will soften or flow to a measurable degree above some higher temperature. "Thermoset" means that the thereby described material is a solid at 25°C. which will not soften or flow, or cannot be reformed, at any higher temperature.

"Crystalline" means that the thereby described polymeric material exhibits a definite X-ray pattern for at least 50% of its polymeric structure when subjected to X-ray analysis.

"Amorphous" means that the thereby described polymeric material is devoid of a definite X-ray pattern for more than 50 % of its polymeric structure when subjected to X-ray analysis.

"Ta" means the temperature at which a thermoplastic material exhibits hot tack adhesion.

"Tm" means, with respect to a crystalline polymer, the melting point of such polymer.

"Tg" means, with respect to an amorphous polymer, the temperature at which such polymer changes from a brittle to a rubbery condition. In a crystalline polymer it is the temperature at which the polymer becomes glassy.

"Plastic" means a natural or synthetic resin.

"Normally solid" means solid at 25°C.

"Wet" or "Wetting" means the relative ability of one material to achieve interfacial contact with another material.

"Hot tack adhesion" means the ability of one material to exhibit adhesion to a second material while the first material is in a molten state, above its Tm or Tg.

"Fusion point" means a temperature at which a material softens or melts.

"Cohesive Flow Property" means the property of a material in the molten state to be so readily distorted by external forces that the geometric cross-sectional area of such material will change substantially under such forces.

Most thermoformable materials have a Ta, i.e., a temperature at which they will exhibit hot tack adhesion to other materials. In the case of crystalline polymeric materials this Ta occurs about 5° to 10°C. above the Tm of such polymeric materials.

In the case of amorphous materials the Ta varies considerably, depending on the structure and molecular weight of the material. For the amorphous polymers, therefore, the Ta may be about 30° to 150°C. above the Tg of such polymers.

The Tm or Tg will also vary for a given polymeric backbone, depending on the molecular weight and density of the polymer.

The following is a listing of various polymeric materials which may be used in the present invention with a listing of their Tm or Tg, and their Ta, in °C.

The Ta values reported here specifically relate to the Ta of the polymer when the polymer is being adhered to an aluminum substrate. The Ta value will be essentially the same for other substrates.

| Polymer | Tg | Tm | Ta |
|---|---|---|---|
| 1. polyethylene Density=0.96 M.I.=3–5 | — | 126 | 135–140 |
| 2. polyethylene Density=0.94 M.I.=12–15 | — | 122 | 130–135 |
| 3. polyethylene Density=0.924 M.I.=1.2 | — | 100–108 | 120 |
| 4. polyvinyl chloride | >5 | — | 155 |
| 5. Nylon-6 | 60 | 215–220 | 240 |
| 6. Nylon-6,6 | 65 | 260 | 270 |
| 7. Polycarprolactone | — | 58 | 60 |
| 8. Polyurethane (polyester) | — | 130–170 | 160–180 |
| 9. polysulfone | 185 | — | 300 |
| 10. polypropylene | −5 to 0 | 165–170 | 170 |
| 11. polycarbonate | 150 | — | 225 |
| 12. polymethylmethacrylate | 90 | — | 160 |
| 13. polystyrene | 100 | — | 185 |
| 14. polystyrene (impact grade) | 100 | — | 180 |
| 15. polyacetal | −60 | 165 | 170 |
| 16. 90/10 mol % copolymer of polymethacrylonitrile & styrene | 115 | — | 240 |
| 17. 70/30 mol % copolymer of polyvinyl alcohol and polyvinyl acetate | 50–60 | — | 120–130 |
| 18. 94.2/5.7 mol % copolymer of ethylene and ethyl acrylate | −20 | — | 110 |
| 19. 91.8/8.2 mol % copolymer of ethylene and acrylic acid | 18 | — | 110 |
| 20. 82/18 wt % copolymer of ethylene and vinyl acetate M.I.=2–3 | −15 | — | 120 |
| 21. styrene-butadiene copolymer | 90 | — | 190 |
| 22. styrene-acrylonitrile copolymer | 100 | — | 190 |
| 23. hydroxy propyl cellulose | 100 | — | 110 |
| 24. (solution blend of) polystyrene and polyphenylene oxide | 115–120 | — | 235 |
| 25. cellulose acetate | 170 | — | 180–190 |
| 26. acrylonitrile-butadiene styrene terpolymer | 100–104 | — | 180 |
| 27. copolymer of ethylene and Na salt of methacrylic acid | 98 | — | 130 |

It has now been found that netting made from a thermoplastic material having a Ta may have its cross-sectional configuration readily expanded by the use of a process which comprises the steps of:

inserting the netting between a pair of platens while the netting is heated to a temperature which is ≥ its Ta, each of the platens having surfaces which are adapted to contact the netting and to being wet by the netting at such contact surfaces at ≥ the Ta of the netting, adhesively bonding the netting by hot tack adhesion to the platens, pulling the platens apart, while the netting is thus adhesively bonded thereto, so as to thereby expand the cross-section of the netting, cooling the expanded netting to a temperature below its Ta, and separating the cooled, expanded netting from the platens.

BRIEF DESCRIPTION OF THE DRAWINGS

FIG. 13 shows a top view of another blank having a circular configuration which may be expanded in the process of the present invention.

FIG. 14 shows a top view, and FIG. 15 shows a cross-sectional view, of an expanded blank made from the blank of FIG. 13.

Figure 1:
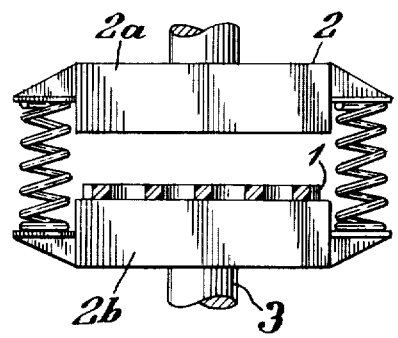
FIGS. 1–3 show a sequence of steps involved in increasing the cross-sectional area of netting according to one embodiment of the present invention.

The present invention is based upon the property of various materials, and particularly thermoplastic polymeric materials, to exhibit hot-tack adhesion to practically all substrates at a temperature, Ta, which is above the Tg or Tm of the thermoplastic polymeric material. Thus, in a fused or molten state, the thermoplastic polymeric material will wet out practically all substrate surfaces and thereby impart adhesion thereto. In some cases this adhesion phenomena will be lost as soon as the thermoplastic polymeric material cools below its Ta.

Thus, if a sheet of netting of thermoplastic polymeric material is placed between the platens of a heated press so that the temperature of the platens is about Ta or 5° to 10°C. above the Ta of the polymeric material in the netting, then the adhesive forces of the polymeric material to the platens are greater than the cohesive flow properties of the polymeric material itself. As a result, it is possible to mechanically move the platen surfaces a certain distance apart with the polymeric material bonded thereto without causing a rupture of the adhesion between the platens and the fused material.

Although the volume or mass of the expanded fusible material does not change, the cross-sectional configuration of the fusible material is expanded in the direction of the two separated platens as a result of the adhesive force or attraction between the fused netting material and the platens. The extent to which the cross-sectional area of the fused netting material can be so expanded is thus primarily determined by the strength of the adhesive bond between the fused netting and the platens, and the extensibility, in the molten state, of the thermoplastic resin in the netting. The stronger is such adhesive bond, the greater is the amount of cohesive flow that can be tolerated by the molten resin without a rupture of the bond occurring. The strength of the bond will thus depend on the nature of the thermo-plastic resin in the netting, the nature of the platen materials, the extent of the surface area of the platens which is in contact with the fused netting and the cohesive strength properties of the polymeric plastic.

Thus the use as platens, of materials which are more readily wet by the fused plastic netting will allow for a wider separation of the platens with the fused plastic bonded thereto, than would the use of platens made from materials which are not as readily wet by the fused netting. Also, the use of netting which is made from thicker gauge strands or which has a smaller mesh configuration will allow for the wetting with the netting of a larger amount of the surface area of the platens and thus allow for the attainment of greater adhesive forces between the fused netting and the platens.

The speed with which the platens are moved apart during the expansion of the netting is not critical. The speed to be used is governed by the cohesive flow properties of the fused netting. The netting commonly used commercially today has thicknesses of the order of about 10 to 300 mils. Such netting may be expanded $\geq$ 2 to 20 times such thicknesses according to the present invention by expanding the fused netting at a rate of separation of the platens of about 10 to 150 mils per second.

After the desired separating distance has been achieved, the polymeric netting is cooled, to a temperature of about 10°–40°C. below its HDT, the press is opened and the netting is removed therefrom in its expanded condition. At this point the expanded netting may or may not continue to adhere to the platen surfaces, depending on the nature of the platens and the polymeric materials. HDT is the heat distortion temperature or point.

When the expanded blank is cooled below its Ta, or even below its Tm and/or Tg, it will not necessarily, in all cases, automatically lose its adhesion to the surfaces of the mold plates. The expanded blanks which are made of materials which are non-polar in nature, such as the polyolefin resins, will generally readily lose their adhesion to the surfaces of all of the types of mold plates which may be used in the process of the present invention, and which are listed below in more detail. The expanded blanks which are made of polar materials, i.e., materials comprising compounds which possess an electric moment, such as polysulfone resins and resins containing carboxyl, hydroxyl and ester groups, will tend to remain bonded to the surfaces of most, if not all, of the mold plates which may be used in the process of the present invention. However, even where adhesion between the expanded blank and the mold plates is not automatically lost upon cooling the expanded blank, the cooled blank, can be mechanically stripped from the mold plates without disrupting and integrity or configuration of the expanded blank.

The expanded blank is cooled to a temperature below its heat distortion point, before being removed from the press so as to freeze, so to speak, the configuration of the expanded blank, and thus prevent distortion of such configuration.

Figure 2:
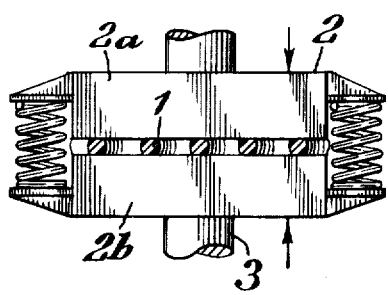
Figure 3:
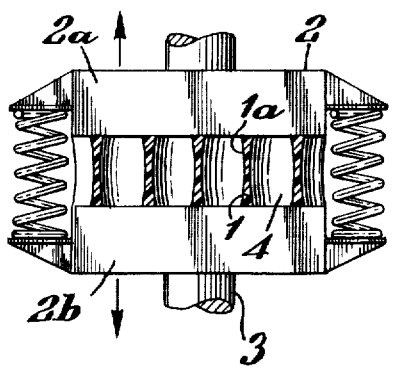

A better understanding of the process of the present invention can be obtained from the process sequence illustrated in FIGS. 1 to 3.

In FIG. 1, there is shown a layer of netting 1 which is inserted in the open jaws of a Carver press 2. The platens 2a and 2b of the press are heated, for the purposes of the present invention, to a temperature which is about Ta or 5° to 10°C. above the Ta of the netting 1. The platens may be heated before, preferably, or after the netting is inserted in the press.

The Carver press described herein is a 20 ton hand operated hydraulic ram 3 which actuates a movable 6 inch × 6 inch lower platen 2b against a fixed platen 2a. The platens of the press are usually heated electrically. Although the Carver press is the preferred means for bringing the heated platens into contact with the netting materials, according to the present invention, other suitable devices may be used such as heated belts.

The process of the present invention may be conducted continuously or discontinuously. Using devices such as the Carver press, the process is readily conducted discontinuously. The process may be conducted continuously by feeding a continuous web of netting between a pair of heated continuous belts of materials suitable as platens. Removable mold plates may also be used as the mold surfaces in the Carver press instead of the platens.

After the platens have been expanded the desired distance they are cooled to a temperature which is about 20° to 40°C. below the Ta of the netting plastic. The cooling may be allowed to occur in the ambient air, or by circulating a cooling medium through the platens, or by conduction through cooled platens, or in some cases by a liquid coolant spray, or by a combination of such procedures.

The mold plates may be disengagable from the rest of the press so as to allow another set of mold plates to be inserted and used in the press with another piece of netting while a previously used pair of mold plates having a piece of expanded netting therebetween is allowed to cool. The mold plates should also be disengagable from the rest of the press where the nature of the fusible netting and of the plates is such that the cooled expanded netting remains bonded to one or both of the plates. In the latter case, laminates may be readily formed with the disengagable mold plates as skin laminae and the expanded netting material as core lamina. When such laminates are desired, similar or dissimilar mold plates can be used so as to provide laminates with similar or dissimilar skin laminae, or even laminates wherein only one of the plates remains bonded to the cooled expanded netting material.

For aesthetic, or other purposes, it may be desired to expand the cross-section of the netting in a non-uniform manner so as to provide expanded netting which has cross-sectional areas of various degrees of thickness.

Figure 6:
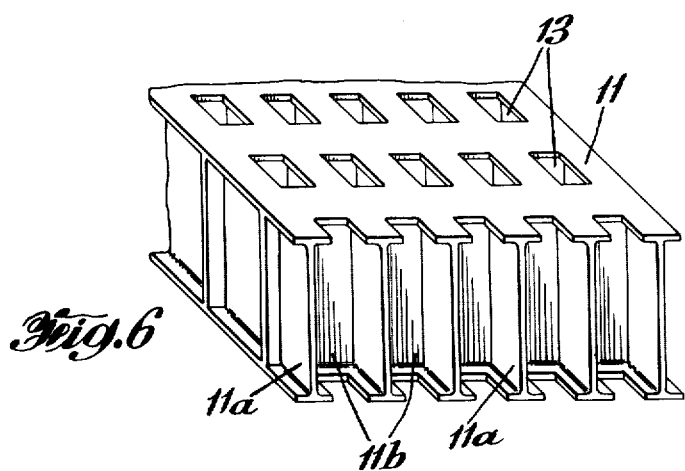
Figure 9:
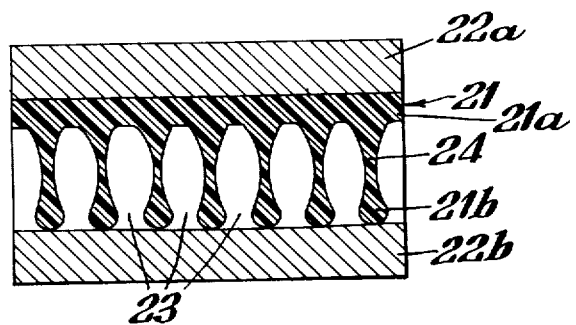

For many end-use applications the netting should be expanded only up to a point where, in its expanded and cooled state, the cross-sectional area of the expanded netting is still thick enough and strong enough to support the uppermost, and relatively thick walled, surface of the expanded netting, when the expanded netting is laid on its other heavy walled surface, as shown in FIG. 6 of the drawings. The need for this type of strength in the rib members (11a, 11b, 21a and 21b in FIGS. 6 and 9) may be more acute where such rib members are also to support, in a laminate structure, a laminae layer such as platen or mold plate 22a as shown in FIG. 9.

FIG. 2, shows the press after it has been closed with sufficient pressure to cause the top and bottom platens, 2a and 2b respectively, to exert a slight pressure on netting 1 so as to cause the heated netting to wet the surfaces of platens 2a and 2b which come in contact with the netting. The amount of pressure required for this step is of the order of about 1 ounce to 4 pounds per square inch. The pressure causes the netting to be slightly compressed.

FIG. 3 shows platens 2a and 2b pulled apart after the expansion step, with the expanded netting 1 adhering thereto. During the expansion step, as will be discussed in more detail below, areas of reduced pressure 4 arise within the cross-section of the expanding netting. The side walls of individual areas 4 are defined by rib members 1a of the netting. The top and bottom walls of areas 4 are defined by platens 2a and 2b. The reduced pressure in areas 4 is caused by the fact that each area 4 tends to become a sealed chamber when the netting 1 fuses to platens 2a and 2b, and, as the platens are pulled apart, the sealed areas 4 become enlarged, thus creating areas of reduced pressure. To prevent the higher ambient pressures from distorting or rupturing expanded walls 1a of the netting, areas 4 of the netting are vented during the expansion step so as to equilibrate the pressure within said areas 4 with the ambient pressure outside the netting material. This venting tends to regulate the uniformity and integrity of the resulting cross-sectional geometry of the expanded netting. Where all the strands of the netting are coplanar, the venting usually has to be accomplished through the platens or mold plates. Where the strands of the netting are not all coplanar, it may be possible to accomplish the venting through the netting, and/or through the platens, as will be discussed below.

In the expanded structure, the expanded rib members 1a tend to have relatively thin walls, and the areas of the expanded netting adjacent the platens have relatively thick walls.

Figure 4:
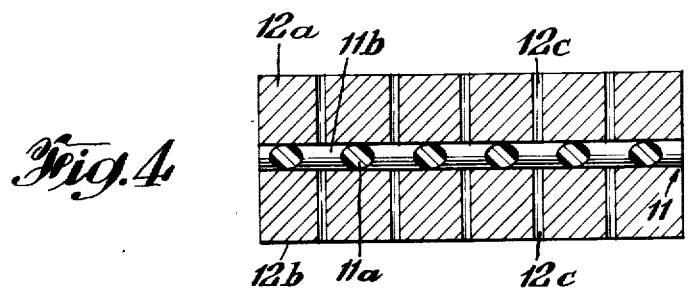
FIGS. 4 to 6 show the expansion of netting wherein all the strands of the netting are coplanar to each other.
Figure 5:
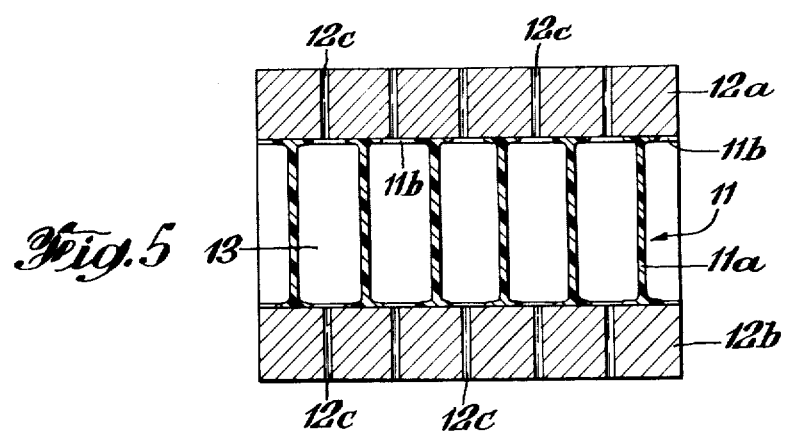

FIGS. 4 to 6 depict the expansion, in accordance with the present invention, of netting wherein all of the strands thereof are coplanar to each other. In FIG. 4 the netting 11 is shown, in cross-section, between heated platens 12a and 12b of a press as the press is closed so as to slightly compress the netting and affect the wetting therewith of the adjacent surfaces of the hot platens. Netting 11 is composed of a series of strands 11a which run parallel to each other, and which also run perpendicular to a series of strands 11b.

Strands 11b are also parallel to each other. Thus, all of strands 11a and 11b are coplanar with each other. Ventholes 12c are in platens 12a and 12b for venting the void areas between the strands during the expansion step. Porous platens or perforated mold plates may be used in lieu of vented platens.

In FIG. 5 there is shown, in cross-section, the expanded netting 11 in the extended platens 12a and 12b. The expanded ribs 11a have an I beam configuration, as will also have expanded ribs 11b. Expanded ribs 11a and 11b are all still coplanar, with expanded ribs 11a still running parallel to each other and perpendicular to expanded ribs 11b. Ventholes 12c are positioned in the faces of either or both of the platens or mold plates so as to provide at least one such vent hole for each void area 13 formed within the cross-section of the expanding netting. As the netting is expanded during the expansion step, the vent holes 12c are used to equilibrate the pressure within the expanding voids with the pressure without the netting so as to prevent rupture or distortion of the expanding rib members 11a and 11b.

In FIG. 6 there is shown an isometric view of the expanded netting 11 after it is removed from the press. After being cooled and removed from the press the netting retains its expanded shape. Rib members 11a and 11b retain their respective spatial relationships and coact to define void areas 13 which had to be vented, as noted above, during the expansion of the netting.

Figure 7:
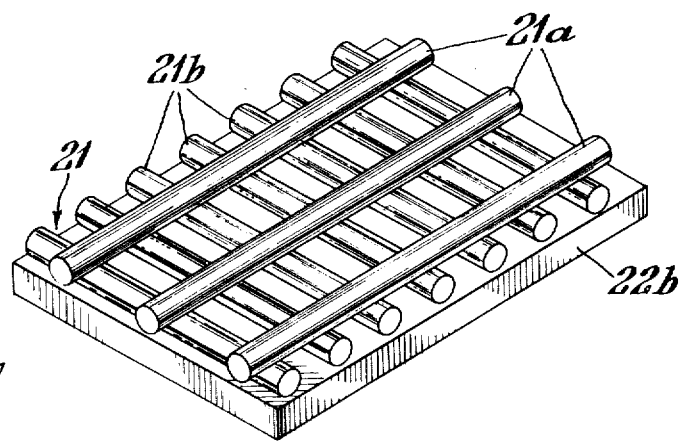
FIGS. 7 to 9 show the expansion of netting wherein all the strands of the netting are not coplanar to each
Figure 8:
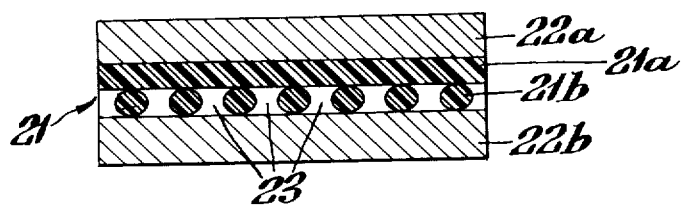

FIGS. 7 to 9 depict the expansion, in accordance with the present invention, of netting wherein all of the strands thereof are not coplanar to each other. FIG. 7 shows, in isometric view, netting formed of a layer of parallel strands 21a which are positioned atop, and perpendicular or diagonal to, a second layer of strands 21b. The netting is shown on a lower platen 22b of a Carver press.

FIG. 8 shows a side view of the press after heated upper platen 22a and lower platen 22b of the press have been closed on the netting therein so as to slightly compress the netting and affect wetting therewith of the adjacent surfaces of the hot platens.

Strands 21a may be bonded to strands 21b of the netting before the netting is placed in the press. There are many types of netting commercially available which have the configuration shown in FIGS. 7 to 8. In such netting strands 21a and 21b are usually of the same composition. The bonding of the strands is usually done by fusing the abutting surfaces of the strands to each other. The heating and expansion of the strands in the process of the present invention does not rupture the bonds between strands 21a and 21b.

Venting of the voids between the strands is readily accomplished during the expansion step of the process of the present invention where the netting has the configuration shown in FIGS. 7–8. The venting is accomplished through void areas 23 which occur between each parallel pair of strands 21a or 21b.

FIG. 9 shows a side view of expanded netting 21, before it has been removed from platens 22a and 22b. In the expanded netting, rib members 24 having I beam configurations have been formed. These rib members retain this configuration after the expanded netting is cooled and removed from the press. The expanded rib members 24 form when the heated platens, with strands 21a and 21b bonded thereto by hot tack adhesion, are pulled apart. The rib members 24 form at the points of contact between strands 21a and 21b.

Figure 10:
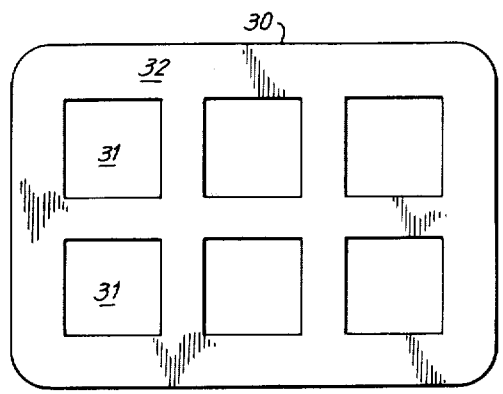
FIG. 10 shows a blank having a lattice configuration which may be expanded in the process of the present invention.

FIG. 10 shows a top view of a thin blank 30 of resin having a lattice configuration. The blank 30 was prepared by punching the depicted pattern of rectangular shaped perforations 31 in a continuous sheet of resin. The perforations are separated by the web 32 of the blank. The perforations can be circular, triangular or any other desired shape. The pattern of the perforations can also be varied from the aligned rows and columns of perforations 31 shown in FIG. 10. The perforations can also be arranged, for example, in staggered rows and columns, in single rows or columns, or in a circular pattern.

Figure 11:
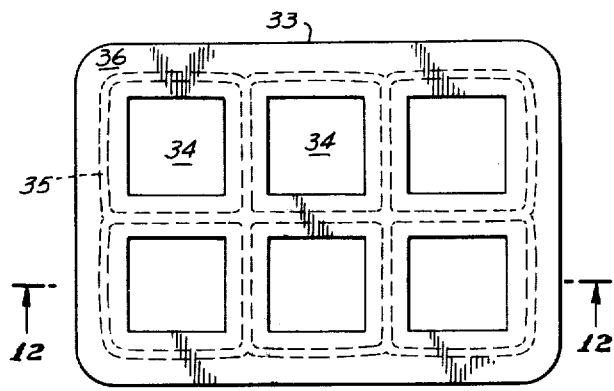
FIG. 11 shows a top view.
Figure 12:
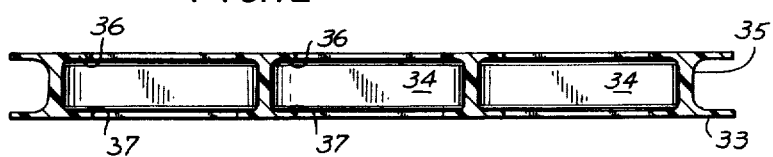
FIG. 12 shows a cross-sectional view, of an expanded article made from the blank of FIG. 10.

FIG. 11 shows a top view and FIG. 12 shows a cross-section view of expanded article 33 made from blank 30 by the process of the present invention. Article 33 was prepared by expanding blank 30 in a Carver Press as disclosed above, between the flat surfaced upper platen of the press, and a mold plate attached to the lower platen of the press. The mold plate was smooth surfaced and had a series of vent holes punched through its cross-section. Blank 30 was positioned in the press so that at least one of these vent holes was adjacent each perforation 31 in the blank. During the expansion step the upper and lower surfaces of web 32 of the blank adhered to the contact surfaces of the upper platen and the lower mold plate, respectively; of the press. Cells 34 in article 33 arose at the site of perforations 31 during the expansion step, and were vented through the vent holes provided in the lower mold plate and through the imperfect seal that exists between the lower mold plate and the lower platen. Cells 34 in Article 33 are separated and bounded by I beam shaped wall members 35. The upper flanges 36 and lower flanges 37 of wall members 35 provide the continuous upper and lower, respectively, web surfaces of article 33. Such flanges also provide a continuous lip member around the top and bottom openings of each cell 34.

FIG. 13 shows a top view of a thin blank 38 of resin having a row of circular perforations 39 punched therein. The blank 38 was prepared by punching the depicted pattern of perforations 39 in a continuous sheet of the resin. The perforations 39 are separated by the web 40 of the blank.

FIG. 14 shows a top view and FIG. 15 shows a cross-sectional view of expanded article 41 made from blank 38 by the process of the present invention. Article 40 was prepared by expanding blank 38 in a Carver Press as disclosed above, between the flat surfaced lower platen of the press, and a mold plate attached to the upper platen of the press. The mold plate was smooth surfaced and provided vent holes adjacent each perforation 39 in blank 38. During the expansion process the upper and lower surfaces of web 40 of the blank adhered to the contact surfaces of the upper platen and the lower mold plate, respectively of the press. Cells 42 in article 41 arose at the site of perforations 39 during the expansion step, and were vented through the vent holes provided in the lower mold plate and through the imperfect seal that exists between the lower mold plate and the lower platen of the press. Cells 42 in article 41 are separated by and bounded by I beam shaped wall members 43. The upper flanges 44 and lower flanges 45 of wall members 43 provide the continuous upper and lower, respectively, web surfaces of article 41. Such flanges also provide a continuous lip member around the top and bottom openings of each cell 42. Article 41 may be used as a package or carrier for cans or bottles 46.

Figure 16:
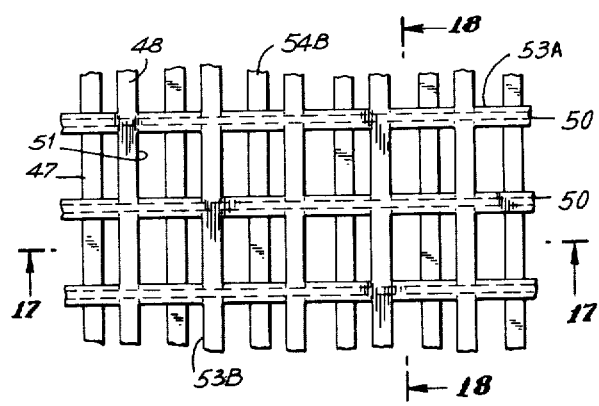
FIG. 16 shows a top view.
Figure 17:
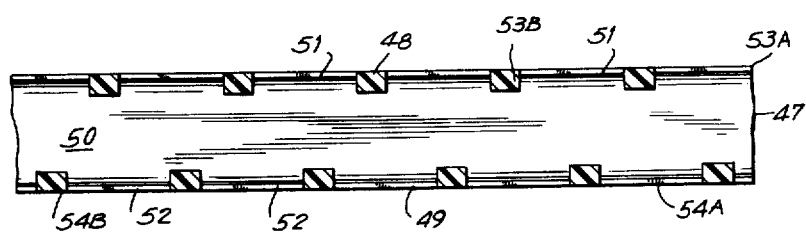
FIGS. 17 and 18 show cross-sectional views, of another expanded article which may be made with the blank of FIG. 10.
Figure 18:
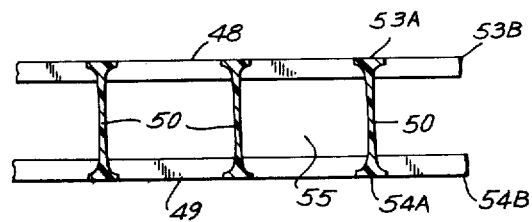

FIG. 16 shows a top view, FIG. 17 shows a cross-sectional view through section 17—17 of FIG. 16, and FIG. 18 shows a cross-sectional view through section 18—18 of FIG. 16, of an expanded article 47 which may be made by the process of the present invention using perforated blanks such as those shown in FIG. 10. Article 47 has a upper surface 48 and a lower surface 49. These surfaces are connected by wall members 50 which run the length of article 47. Each of surfaces 48 and 49 provides a pattern of aligned rows and columns of rectangular upper perforations 31, and lower perforations 52, respectively. The perforations in each surface are separated and bounded by upper web members 53a and 53b, lower web members 54a and 54b, lower web members 54a and 54b, respectively. Web members 53a and 54a run the length of article 47, and web members 53b and 54b run the width of article 47. Each of the perforations in one of surfaces 48 and 49, overlap, in the vertical plane, about one half of each of two perforations in the other surface. Article 47 was prepared from two perforated blanks of resin, each of which had the identical pattern of perforations therein. The pattern was that shown by the pattern of perforations 51 and 52 in surfaces 48 and 49. When inserted in the Carver Press to be expanded the two blanks were placed one on top of the other so as to provide the pattern of perforation overlap shown in FIGS. 16–18. Thus web members 53a were placed along the length of web members 54a, and web members 53b were positioned so as to overlap, in the vertical plane, the center line of a perforation 51 in lower surface 49. Thus web members 53b and 54b never contacted each other. When the press was closed to fuse the resin the two blanks fused together at their points of contact, which was essentially at the interface of aligned web members 53a and 54a, and which ran the length of the fused blank. When the press was opened to expand the fused composite blank, upper surface 48 of the blank adhered to the upper mold pattern, and lower surface 49 of the blank adhered to the lower mold platen and expanding walls 50 are pulled at the interface of aligned web members 53a and 54a. The longitudinal voids 54 that arise during the expansion step between walls 50 are vented out the ends thereof.

THE NETTING

The materials which may be employed as the netting components are normally solid materials which have a Ta of about 50° to 300°C., and preferably of about 100° to 250°C.

If there is a difference of at least about 10°C., between the Ta's of any two fusible materials that could be used as the heating platens, then the fusible material having the lower Ta could be used as the netting material.

The netting may be used in a woven or non-woven form. The mesh configuration of the netting can vary depending on the nature of the intended application. The fusible material used for the netting need not have any elastomeric qualities.

The netting material to be used in the present invention would include any material having a lattice or network type of configuration.

Fusible materials which might be used as netting would include natural and synthetic thermoplastic resins and low melting elemental metals and alloys and compounds thereof.

The natural resins would include materials such as asphalt, bitumen, gums, pitch and tar.

The synthetic resins would include the vinyl resins. These vinyl resins may be either homopolymers of an individual vinyl monomer or they may be interpolymers of one or more vinyl monomer and form 0 to about 50 mol per cent of one or more non-vinyl monomers which are interpolymerizable with vinyl monomers. The term "vinyl monomer" means a compound which contains at least one polymerizable group of the formula

Such vinyl monomers, therefore, would include the following: unsubstituted olefins, including monoolefins such as ethylene, propylene, 1-butene, and isobutylene and polyolefins such as butadiene, isoprene, dicyclopentadiene and norbornene; halogenated olefins such as chloroprene, tetrafluoroethylene, chlorotrifluoroethylene, hexafluoropropylene; vinyl aryls such as styrene, o-methoxystyrene, p-methoxystyrene, m-methoxystyrene, o-nitrostyrene, p-nitrostyrene, o-methylstyrene, p-methylstyrene, m-methylstyrene, p-phenylstyrene, o-phenylstyrene, m-phenylstyrene, vinylnaphthalene and the like; vinyl and vinylidene halides, such as vinyl chloride, vinyl fluoride, vinylidene chloride, vinylidene fluoride, vinylidene bromide and the like; vinyl esters such as vinyl formate, vinyl acetate, vinyl propionate, vinyl butyrate, vinyl chloroacetate, vinyl chloropropionate, vinyl benzoate, vinyl chlorobenzoate and the like; acrylic and alpha-alkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethyl methacrylamide, acrylonitrile, chloroacrylonitrile, methacrylonitrile, ethacrylonitrile, and the like; maleic and fumaric acid and their anhydrides and alkyl esters such as maleic anhydride, dimethyl maleate, diethyl maleate and the like; vinyl alkyl esters and ketones such as vinyl methyl ether, vinyl ether, vinyl isobutyl lether, 2-chloroethyl vinyl ether, methyl vinyl ketone, ethyl vinyl ketone, isobutyl vinyl ketone and the like; also vinyl pyridine, N-vinyl carbazole, N-vinyl pyrrolidone, ethyl methylene malonate, acrolein, vinyl alcohol, viniyl acetal, vinyl butyral and the like. Non-vinyl monomers which may be interpolymerizable with vinyl monomers include carbon monoxide and formaldehyde.

The vinyl polymers would thus include, for example, polyethylene, polypropylene, ethylene-propylene copolymers, polyvinyl chloride, polyvinylidene chloride, polyvinyl fluoride, polystyrene, styrene-butadiene-acrylonitrile terpolymers, ethylene-vinyl-acetate copolymers, ethylene-acrylic acid copolymers, ethylene-acrylonitrile copolymers and styrene-acrylonitrile copolymers.

In addition to the vinyl polymers, other polymeric materials which may be used in accordance with the present invention include thermoplastic polyurethane resins; polyamide resins, such as the nylon resins, including polyhexamethylene adipamide; polysulfone resins; polycarbonate resins; phenoxy resins; polyacetal resins; polyalkylene oxide resins such as polyethylene oxide and polypropylene oxide; polyphenylene oxide resins; and cellulose ester resins such as cellulose nitrate, cellulose acetate and cellulose propionate.

Also included within the term "polymer" are blends of two or more polymeric materials. Illustrative of such blends are polyethylene/polypropylene; low density polyethylene high density polyethylene; polyethylene with olefin interpolymers such as those indicated above, for example, ethylene/acrylic acid copolymers, ethylene-ethyl methacrylate copolymers, ethylene-ethylacrylate copolymers, ethylene-vinyl acetate copolymers, ethylene-acrylic acid-ethylacrylate terpolymers, ethylene-acrylic acid-vinylacetate terpolymers, and the like.

Also included within the term "polymer" are the metallic salts of those polymers or blends thereof which contain free carboxylic acid groups. Illustrative of such polymers are ethylene-methacrylic acid copolymers, ethylene-ethacrylic acid copolymers, styrene-acrylic acid copolymers, butene-acrylic acid copolymers, and the like.

Illustrative of the metals which may be used to provide the salts of such carboxylic acid polymers are the 1, 2, and 3 valent metals such as sodium, lithium, potassium, calcium, magnesium, aluminum, barium, zinc, zirconium, beryllium, iron, nickel, cobalt, and the like.

The polymers may be used in any of the forms in which they are commonly employed in the molding arts such as in the form of powder, pellets, granules and the like, and blends of the same with one or more adjuvant materials. Such adjuvant materials would include materials such as plasticizers, heat and light stabilizers, fillers, pigments, processing aids, extenders, fibrous reinforcing agents, impact improvers, metal particles and carbon particles.

The particular polymeric material being used would dictate the selection and quantity of the adjuvants to be employed therewith, since it is the respective adjuvants for such polymers that are employed in the present invention. The adjuvants employed must be physically and chemically compatible with ech of the other components of the compositions under the described operating conditions. The adjuvants are used in amounts which will be effective for the intended purpose. Thus, for example, the effective amount of plasticizer is a "plasticizing amount", that is, an amount of plasticizer which will appreciably increase the flexibility, processability, workability and/or distensibility of the polymer. The stabilizers would be used in a stabilizingly effective quantity, and the fillers would be used in effective quantities therefor, as for example, if a reinforcing filler is to be used then the filler would be used in such amounts so as to provide the desired reinforcing effect.

The polymer based compositions employed in the present invention may be prepared by any of the commonly employed techniques employed for compounding such compositions. Such procedures would include techniques such as dry blending or hot compounding, as well as with or without the use of mixing equipment such as ribbon blenders, muller blenders, intensive mixer blenders, extruders, banbury mixers and the like.

Although metallic materials of construction are usually only used as the platens in the process of the present invention, it is possible that expanded netting of the present invention can also be made wherein a low melting metal, or alloy or compound thereof, can be used as the netting with platens made from non-fusible materials, or materials having higher fusion points than such low melting metallic materials.

THE PLATENS OR MOLD PLATES

The heating platens or mold plates which are used to pull the netting apart will usually have a continuous face. However, it may be possible to provide platens or mold plates which have surfaces which have a meshed face which corresponds in configuration of the mesh of the netting being pulled apart. The two platens or mold plates used to pull the netting apart can be made of the same or different materials. The platens or mold plates may have continuous or perforated surfaces, they may also be porous or non-porous.

During the molding operation it is desirable in some cases, as noted above, to vent the interior portions of the netting which are being pulled apart. The need for venting the netting being molded arises due to the fact that a vacuum is created within the interior sections of the netting by virtue of the increase of the volume of such interior portions during the expansion operation. If the netting material is not vented during the expansion operation, atmospheric pressure could cause puncture of the extended rib sections of the expanded netting during the expansion operation. This venting of the expanded netting can be accomplished by using perforated or porous platens or mold plates.

The materials from which the platens or mold plates may be fabricated are normally solid materials which are either not fusible at the operating temperatures or which have a Ta which is at least 10°C. higher than the Ta of the fusible material from which the netting is fabricated.

Non-fusible materials which may be used for the platens or mold plates would include cellulosic materials such as wood, paper, cardboard and compressed sawdust; thermoset or vulcanized compositions based on natural or synthetic resins; minerals such as graphite, clay and quartz; natural rock and stone materials such as marble and slate; building materials such as brick, tile wallboard and concrete; and proteinaceous materials such as leather and hides.

Fusible materials having a relatively high Tg or Tm which could be used as the platens or mold plates would include metals such as aluminum, iron, lead, nickel, magnesium, copper, silver and tin, as well as alloys and compounds of such metals, such as steel, brass and bronze; vitreous materials such as glass, ceramics and porcelain; and thermoplastic resins having a relatively very high fusion point, such as the so called engineering plastics, such as polytetrafluoroethylene, nylon-6 resins, polyacetal resins, polyvinylidene fluoride, polyesters and polyvinyl fluoride.

The use of mold release agents such as silicone oils and fluorocarbon oils, or the use of platens or mold plates made of materials having a low surface energy such as polytetrafluoroethylene, will insure the separation of the cooled expanded blank from the platens or mold plates after the expansion operation, when the cooled expanded blank would not otherwise readily separate from the mold plates or platens.

For various applications it may be desirable to promote the adhesion of the expanded blank to the mold plates where the mold plates are to be laminated to the expanded netting. Certain compounds can be used as adhesion promoters for such purposes. The preferred of these adhesion promoters are various organosilicon compounds. These adhesion promoters may be used as primers and applied to the surfaces of the laminae substrates in layers which are at least monomolecular in depth. The adhesion promoters may also be incorporated or admixed in with the components of the expandable blank. In the latter case, the adhesion promoter is added to the blank in an amount of about 0.00001 to 5.0 percent by weight based on the weight of the blank.

When the organo-silicon compound is to be used as a primer or incorporated into the blank, it may be used in the form of a solution of an organic solvent such as an alcohol, an ester, a ketone, an aromatic or aliphatic hydrocarbon, a halogenated hydrocarbon, or mixtures of such solvents.

Examples of the organo-silicon compounds which may be used include silyl peroxide compounds, alkoxy silanes, amino-alkoxy silanes, vinyl alkoxy silanes and amino-alkyl-alkoxy silanes.

The silyl peroxide compounds may be in the form of a monomer or polymer, e.g., silane or siloxane. They may, in fact, be any silicon-containing compound which contains an organo-peroxy group bonded to silicon, which organo moiety is bonded to the peroxy oxygen and thence to the silicon by a non-carbonyl carbon atom.

These silyl peroxides can be made pursuant to the processes described in U.S. Pat. No. 3,631,161 and Candian Pat. No. 924,230.

Specific examples of such silyl peroxide compounds are vinyl tris(t-butylperoxy)silane,allyl tris(t-butyl peroxy) silane, tetratris(t-butylperoxy)silane, allyl(t-butylperoxy)tetrasiloxane,vinyl methyl bis(t-butylperoxy)silane,allyl methyl bis(t-butylperoxy)silane, methyl tris(t-butylperoxy) silane, dimethyl bis(t-butylperoxy)silane, isocyanatopropyl tris(t-butylperoxy)silane and vinyl diacetoxy(t-butylperoxy)silane.

The amino alkyl alkoxy silanes would include those having the structure:

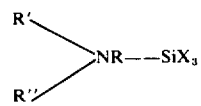

wherein X is alkoxy, aroxy or acryloxy; R is divalent alkylene of 3-8 carbon atoms with at least 3 sequential carbon atoms separating N from Si; at least one of R' and R'' is hydrogen, and any remaining R' or R'' is alkyl, HO—[CH$_2$CH$_2$(O)$_x$]$_{1-5}$ where $x$ is 0 or 1, H$_2$NCO—, H$_2$NCH$_2$CH$_2$— and H$_2$NCH$_2$CH$_2$NHCH$_2$CH$_2$—.

Examples of such aminoalkyl-alkoxy silanes would include gamma-aminopropyltriethoxy silane, gamma-aminopropyltrimethoxy silane, bis(beta-hydroxymethyl)gamma-aminopropyltriethoxy silane and N-beta(aminoethyl)gamma-aminopropyl triethoxy silane.

As noted above, one or both of the surfaces of the plates which are used to adhere to, and pull and expand the blank of plastic, may be an integral part of the press platens or molding device. One or both of the mold plates may also be removably mountable on the platen or molding device. The use of the removable type of mold plate is preferable where the mold plates are to be perforated or porous, so as to effect the venting therethrough.

The following examples are merely illustrative of the present invention and are not intended as a limitation upon the scope thereof.

The press used in these examples was a spring loaded Carver press, as shown in FIGS. 1 to 3 of the drawings. Two springs were used in the press and each had a deflection of 130 pounds per inch, and the springs were designed to mechanically pull the platens and mold plates apart, as explained above with reference to FIGS. 1 to 3, at a predetermined rate, as regulated by a needle valve on the hydraulic ram of the press. The platens of the press were malleable cast iron and could be cooled by conduction, as desired, by the circulation of cold water therethrough. The platens of the press could also be heated by conduction, as desired, by heating platens 5A and 5B electrically. The temperature of the surfaces of the heated mold plates and the platens was measured with a thermocoupled pyrometer.

EXAMPLE 1

Polypropylene netting sold by DuPont under the trademark Vexar, has the coplanar configuration of the netting shown in FIG. 4. A sample of this netting measuring 6 inches × 8 inches and having a strand diameter of 120 mils was inserted between steel platens of a Carver press which were heated to a temperature of 175°C. The polypropylene resin had a Tm of 165°–170°C., a Ta of 170°C. and a density of 0.9037. The netting was slightly compressed by the platens to affect hot tack adhesion thereto and the platens were then pulled apart so as to expand the thickness of the netting at the rate of 100 mils per second until the netting was expanded to a thickness of 250 mils. The platens were sintered porous plates, and during the expansion operation the expanding void areas in the expanding netting were vented through the porous platens during the expansion step, as explained above with reference to FIG. 5. The expanded netting was then cooled and removed from the platens. The expanded netting had a shape similar to the structure shown in FIG. 6. As contrasted to the unexpanded netting, the expanded netting could be used for relatively heavy load bearing packaging purposes.

EXAMPLE 2

A 106 mil thick sample of low density polyethylene black pigmented netting having the cross-sectional configuration of the netting shown in FIG. 7, was inserted between non porous steel platens of a Carver press which had been heated to a temperature of 140°C. The polyethylene in the netting had a Tm of 100°–108°C., a density of 0.924, a melt index of 1.2 and a Ta of 110°C. The netting was slightly compressed between the hot platens to affect hot tack adhesion thereto. The netting was then expanded at 130°C. at the rate of 1000 mils/15 seconds to a new height of 215 mils, by pulling the platens apart. The expanded netting, when cooled, to about 60°C. readily separated from the platens of the press. This netting had tiered strands which permitted venting between the strands of the netting as described above with respect to FIG. 8. The ribs of the expanded netting could be folded together and extended apart, in the horizontal plane of a sheet of the netting, in the manner of the opening and folding of the sides of an accordian. The expanded netting was thus substantially more flexible and extensible than the unexpanded material. The expanded netting furthermore, had a spring constant in deflection characteristic of energy absorption materials, which was not evident in the unexpanded netting.

EXAMPLE 3

Two thicknesses of 40 mil thick low density polyethylene netting having the configuration of the netting shown in FIG. 7 were laid flat one atop the other between steel platens in a Carver Press heated to 140°C. The polyethylene had a Ta of about 110°C. The flat sheets of netting were then slightly compressed by the hot platens so as to affect hot tack adhesion of the abutting surfaces of the sheets of netting between each other and the surfaces of the hot platens. The platens, now at a temperature of 135°C., were pulled apart, with the two sheets of netting adhering thereto and to each other so as to expand the thickness of the netting about 2½ times. The netting was pulled apart at the rate of 65 mils per second. When cooled to room temperature the expanded netting was readily removed from the press. An examination of the cross-section of the expanded netting showed that each tier of strands was bonded to the next adjacent tier of strands by I beam shaped ribs of the type shown in FIG. 9. The four tiers of strands were thus bonded together by three tiers of the I beam shaped ribs.

EXAMPLE 4

An expanded article 33 as shown in FIGS. 11 and 12 was prepared by the process of the present invention. The plastic blank was made from a 100 mil thick sheet of polyethylene having a density of 0.96, a melt index of 5 and a Ta of 135°–140°C. A series of six 1 inch square perforations, spaced ⅜ inch apart, were punched out, in the pattern shown in FIG. 10, in a 3 inch × 4½ inch sheet of the resin. The blank was expanded in a Carver Press between the smooth surfaced upper platen of the press, and a smooth surfaced lower mold plate attached to the lower platen of the press. The mold plate was 6 inch × 6 inch × ⅛inch and made of aluminum, and had 0.040 inch vent holes drilled through its cross section. The vent holes were so positioned in the mold plate, and the blank was so positioned in the press, that at least one vent hole was provided adjacent each perforation at the interface of the blank and the mold plate. The blank was inserted into the press when the platens and mold plate were heated to 170°C. The press was closed to compress the blank, and fuse the resin so that it adhered to the mold plate and upper platen. The temperature of the press was allowed to drop to 140°C. and then the blank was expanded, by opening the press at the rate of 10 mils/second, to an expanded height of 0.375inch. The expanded blank was rigid and had the configuration of article 33 shown in FIGS. 11–12. The article 33 could be used as a packaging tray with a protective film overwrap.

EXAMPLE 5

An expanded article as shown in FIGS. 14–15 was prepared by the process of the present invention. The plastic blank was made from a 65 mil thick sheet of ethylene/ethyl acrylate copolymer having a Ta of 110°C. An aligned row of four circular perforations, each 1 inch in diameter, was punched out in a 1½inch × 5 inch sheet of the resin the perforations were spaced about ⅛inch apart. The blank was expanded as in Example 4. It was inserted in the press at 150°C. and expanded at 140°C., at a velocity of 15 mils/second to an expanded height of about 200 mils. The expanded blank was flexible and had the configuration of article 41 shown in FIGS. 14–15 of the drawings. It was useful as a carrier or display case for flashlight batteries and small jars and cans. The venting was as in Example 4.

EXAMPLE 6

An expanded article 47 as shown in FIGS. 16 and 17 was prepared by the process of the present invention. The plastic blanks were made from two 65 mil thick sheets of ethyl acrylate copolymer having a Ta of 110°C. A lattice pattern of ⅜ inch square perforations was punched in each blank so as to provide the pattern of perforations shown in surfaces 48 and 49 of article 47. The perforations were spaced about ⅛ inch apart. The two punched out blanks were laid one on top of the other to provide the pattern of perforation overlap shown in FIG. 16, and the composite was then inserted between the smooth surfaced platens of the Carver Press heated to 130°C. The press was then closed to compress and fuse the composite and cause it to wet and adhere to the platens. The temperature of the press equilibrated to 115°C., and the blank was expanded to a height of about ⅜ inch, at the rate of 15 mils/second. The expanded blank was fairly rigid and had the configuration of article 47. It was useful as a lightweight cushioning member.

The expanded netting of the present invention is useful for packaging applications and for cushioning applications.

The amount of pressure used to pull the plates of the press apart in the process of the present invention is about 1 to 10 pounds per square inch of continuous surface area on the blank contact surface of the plates.

Some rigid polymeric materials such as polysulfone resins, polycarbonate resins, and certain vinyl resins such as polyvinyl chloride, tend to develop internal stresses and associated frozen-in-strains when press formed into blanks. When such stresses and strains are present, it is not possible to readily use the blanks in the process of the present invention unless the blanks are first annealed to relax such stresses and strains in the blank. This annealing can be accomplished in about 0.5 to 240 minutes at temperatures ranging from the heat distortion temperature to the melting point of the resin as disclosed in U.S. patent application Ser. No. 213,432 filed Dec. 29, 1971 in the names of Water H. Smarook and John Sonia, now abandoned in favor of continuation-in-part application Ser. No. 427,480 filed Dec. 26, 1973.

Where the compositions used for the thermoformable blank contain fillers, the expansion temperature may have to be increased 5° to 20°C. to compensate for the increased viscosity of the resulting compositions.

Various polymeric resins used as the expandable blanks tend to pick up moisture when exposed to the atmosphere, i.e., about 0.05 to 5.0 weight %. This moisture is preferably removed from the plastic before inserting the plastic in the hot press so as to avoid blistering or bubbling in the heated plastic. The plastics which are more susceptible to this type of moisture absorption are the polycarbonate resins, polymethymethacrylate resins, nylon resins, cellulose acetate resins, acrylonitrile-butadiene-styrene terpolymer resins, hydroxy propyl cellulose resins, styrene-acrylonitrile copolymer resins and phenoxy resins.

For practical purposes the process of the present invention is preferably conducted under ambient conditions of pressure, i.e., atmospheric pressure. The areas, cells, or voids of reduced pressure that are formed within the expanding netting during the expansion step in the process have a partial vacuum therein. Thus the level of pressure within such void areas is below that of the higher level of ambient atmospheric pressure. The venting of these void areas during the expansion step is to allow these two levels of pressure to be equilibrated so as to otherwise avoid rupturing of the rib members that separate such void areas. The partial vacuums are created in these void areas during the expansion step in the process of the present invention because the volume of the void area is expanded within the expanding netting without access, in the absence of the venting, to the ambient atmosphere. The difference between the level of ambient pressure and the level of reduced pressure existing under the partial vacuum conditions in the void areas is sufficient, in the absence of such venting, to rupture the relatively thin wall or rib members of the expanded netting that separate the void areas from each other.

The blanks are uniformly heated prior to the beginning of the expansion step in the process. This can be accomplished by heating the blanks before or after they are inserted between the platens. Where the blanks are relatively thin, i.e., of the order of ≤ 150 mils, they can be readily heated, to the Ta of the thermoformable material therein, between the heated platens. The length of time needed to accomplish this will vary depending on the thickness of the blank, the Ta value, and the thermal conductivity and heat capacity of the thermoformable material, and the amount of contact that exists between the surfaces of the blank and the surfaces of the platen(s). This heating can be accomplished by contact with one or both of the platens.

Where the blanks are thicker than about 150 mils, and/or have relatively high Ta values, and/or will have relatively little contact with the platen surfaces, they can also be heated to a temperature which is, for crystalline materials, about 20°C. below the Tm of such materials, and for amorphous materials, about 20°C below the Ta of the amorphous material, before the blank is inserted between the platens, and then the blanks can be heated to the Ta of the thermoformable material by being heated by contact with the platens and/or by other heating procedures such as by infrared radiation.

The cooling of the expanded blank is conducted so as to solidify or freeze, so to speak, the expanded article in its expanded configuration. This is done by cooling the article below its heat distortion point. This does not necessarily require a quenching or quick cooling operation, unless the expanded thermoformable material is very fluid and/or has relatively thick wall members. Otherwise the cooling can be performed, in most cases, by merely exposing the expanded article to ambient air at about 25°–30°C., i.e., room temperature and/or by cooling the mold surfaces with a cooling medium, such as cold water, that is circulated through the interior of the mold plates. In some cases the cooling can also be hastened by spraying the expanded article with a spray of cool water or other cooling gas or liquid.

The Ta values for a thermoformable material which are reported above were found to be, approximately, the lowest temperatures at which the related thermoformable material could be used in the process of the present invention. The reported Ta values were found, initially, by a trial-and-error technique in which a heated sheet of the thermoformable material (6 inch × 6 inch × 100 mils) was placed between continuous sheets of aluminum (6 inch × 6 inch × 100 mils) so as to ascertain, empirically, by trial-and-error, the minimum temperature at which the process of the present invention could be conducted. The reported Ta value was thus the minimum temperature at which the thermoformable material would adhere to the sheet of aluminum with sufficient force so that mechanical work applied to the molten thermoformable material, in the form of the pulling of the two sheets of aluminum apart, produced a viscous flow in the thermformable material without loss of adhesion to the aluminum plates, as the plates were pulled apart to a height of at least twelve times its original thickness.

These same minimum Ta values, as determined with aluminum mold plates, were also found to be the same (within about ±1°-2°C.) for the respective thermoformable materials when the mold plates were also made of other metals such as steel and brass, and the other conditions were the same.

Subsequent to the initial trial-and-error procedures that were used, as described above, to determine the above reported minimum Ta values for the various listed thermoformable materials, a more rigorous experimental approach was used to ascertain the minimum Ta values for such thermoformable materials. In this procedure an Instron Tensile Strength Tester was used to evaluate each thermoformable material to ascertain its minimum Ta values. The Instron instrument comprised a heated set of metal discs of known cross-sectional areas (0.994 in$^2$) which were thermostatically controlled and housed in a sealable chamber having pyrex windows in the walls thereof for observation purposes. A 100 mil thick disc sample (0.994 in$^2$) of the thermoformable material was then inserted between the metal discs which were heated near the previously (empirically) determined Ta value for such material. The instrument was then subjected to a compressive load of 2 psi for 5 seconds to allow the thermoformable material to be fused by the metal discs and to wet the discs with such material. The instrument was then subjected to a tensile loading at a crosshead speed of 2 inches per minute to determine the minimum temperature at which the thermoformable material was fluid enough to be pulled apart while still adhering to the discs. The tensile loadings required to accomplish this vary from thermoformable material to thermoformable material but were in the range of about 6 to 10 psi of tensile force for the synthetic resins whose (minimum) Ta values are reported above.

It was found that the minimum Ta values, when the thermoformable materials were tested in the Instron tensile tester as noted above, were within ±1°-2°C. of the minimum Ta values which had been previously found for such materials in the initial trial-and-error procedures. These minimum Ta values were also within about ±1°-2°C. for each of such thermoformable materials regardless of whether the metal used in the metal discs of the Instron tensile tester was aluminum, cold rolled steel, hot rolled steel, zinc plated steel or brass. The same results are also obtained when the metal disc was coated with a baked on coating of a dispersion grade of polytetrafluoroethylene. Polytetrafluoroethylene is not useful, however, as a thermoformable material in the process of the present invention since it does not melt with a useful Ta value.

These test results thus provide the basis for the Ta values reported above for each of the listed thermoformable materials. These reported Ta values, however, are the minimum temperatures at which the related thermoformable materials can be employed in the process of the present invention. The useful range of Ta values for a particular thermoformable material, with respect to its utility in the process of the present invention, will vary from themoformable material to thermoformable material. Each thermoformable material has its own peculiar viscosity properties at elevated temperatures i.e., above its minimum Ta value. To be useful in the process of the present invention, at temperatures above its minimum Ta, the thermoformable material must be viscous enough to withstand the force of gravity and not sag between the mold plates during the separation of the mold plates. The useful range of Ta values, therefore, is that wherein the thermoformable material retains its adhesion to the mold plates and at which its melt viscosity is low enough to afford melt flow or extensibility, but at which it is not so fluid, or have such a low degree of viscosity, as to sag under the influence of the forces of gravity. Every material that can be melted usually becomes more fluid, or less viscous, as the temperature of the melt is increased. To be useful in the process of the present invention the thermoformable material cannot be heated so high above its minimum Ta value as to become so fluid in its expanded condition that is has more tendency to sag during the molding cycle under the influence of gravity than to retain its expanded configuration.

As a practical matter as the blank is separated between the hot mold plates, those portions of the expanded blank that are in the cross-section of the expanded blank, and are not in direct contact with the heated mold plates, tend to cool faster and become more viscous, than those portions of the blank that remain in contact with the mold plates.

In the case of crystalline thermoformable materials the useful range of Ta values is relatively narrow, and, in the case of some such materials the useful range of Ta values may only be 5° to 10°C. above the Tm of such materials. In the case of amorphous thermoformable materials the useful range of Ta values is usually broader.

It is to be noted also, that, in the case of polymeric thermoformable materials, the Ta values of polymeric materials made from the same monomers will vary depending on the molecular weight of the polymer. The Ta values for such polymers will usually be proportionally higher as the molecular weight of the polymer is increased.

The speed with which the blank of thermoformable material can be expanded between the mold plates within the useful range of Ta values will also depend on several factors such as the viscosity of the thermoformable material at the Ta value employed, the mass and shape of the thermoformable material, the amount of area of contact between the surface of the mold plates and the surfaces of the blank, and the complexity of the cross-sectional geometry of the expanded article.

What is claimed is:

1. A process for expanding the cross-section of a preform or blank having a lattice or network type of configuration formed from a thermoformable material exhibiting a Ta which comprises positioning said preform or blank between a pair of platens while said preform or blank is heated to a temperature which is ≥ the Ta of said thermoformable material, each of said platens having surfaces which are adapted to contact said preform or blank and to being wet by said thermoformable material at such contact surfaces at ≥ the Ta of said thermoformable material, bringing said platens together so as to cause them to contact said surfaces of said preform or blank, adhesively bonding said preform or blank by hot tack adhesion to said contacting surfaces of said platens, pulling said platens apart, while said preform or blank is thus adhesively bonded thereto, so as to thereby expand the cross-section of said preform or blank, cooling the expanded preform or blank to a temperature below the heat distortion temperature of said preform or blank, and separating the cooled, expanded preform or blank from said platens.

2. A process as in claim 1 in which said preform or blank comprises thermoplastic material.

3. A process as in claim 2 in which said thermo-plastic material comprises synthetic resin.

4. A process as in claim 3 in which said synthetic resin comprises vinyl resin.

5. A process as in claim 4 in which said vinyl resin comprises hydrocarbon resin.

6. A process as in claim 5 in which said hydro-carbon resin comprises polyolefin resin.

7. A process as in claim 6 in which said polyolefin resin comprises polyethylene resin.

8. A process as in claim 6 in which said polyolefin resin comprises polypropylene resin.

9. A process as in claim 1 in which the cross-section of said preform or blank is expanded at least twice its original thickness.

10. A process as in claim 9 in which the cross-section is expanded up to about 20 times its original thickness.

11. A process as in claim 1 in which said preform or blank comprises strands thereof which are not all coplanar with each other.

12. A process as in claim 11 in which void areas having a partial vacuum therein form within the expanding cross-section of said preform or blank during the pulling apart of said platens, and said void areas are vented so as to equilibrate the lower level of pressure within said voids with the higher level of ambient pressure without said preform or blank and thereby regulate the uniformity and integrity of the resulting expanded cross-sectional geometry of said preform or blank.

13. A process as in claim 1 in which the lattic or network type of configuration of said preform or blank comprises strands thereof which are all coplanar with each other.

14. A process as in claim 13 in which void areas having a partial vacuum therein form within the expanding cross-section of said preform or blank during the pulling apart of said platens and said void areas are vented so as to equilibrate the lower level of pressure within such voids with the higher level of ambient pressure without said preform or blank and thereby regulate the uniformity and integrity of the resulting expanded cross-sectional geometry of said preform or blank.

15. A process as in claim 12 in which said venting is accomplished through at least one of said platens.

16. A process as in claim 15 in which said venting is accomplished through both of said platens.

17. A process as in claim 12 in which said venting is accomplished between coplanar strands of the lattice or network type of configuration of said preform or blank.

18. A process as in claim 14 in which said venting is accomplished through at least one of said platens.

19. A process as in claim 18 in which said venting is accomplished through both of said platens.

20. A process for expanding the cross-section of a preform or blank having a lattice or network type of configuration formed from a thermoformable material exhibiting a Ta which comprises positioning said preform or blank between a pair of platens while said preform or blank is heated to a temperature which is ≥ the Ta of said thermoformable material, each of said platens havaing surfaces which are adapted to contact said preform or blank and to being wet by said thermoformable material at such contact surfaces at ≥ the Ta of said thermoformable material, bringing said platens together so as to cause them to contact said surfaces of said preform or blank, adhesively bonding said preform or blank by hot tack adhesion to said contacting surfaces of said platens, pulling said platens apart, while said preform or blank is thus adhesively bonded thereto, so as to thereby expand the cross-section of said preform or blank, and cooling the expanded preform or blank to a temperature below the Ta of said thermoformable material.

* * * * *

UNITED STATES PATENT OFFICE
CERTIFICATE OF CORRECTION

Patent No. __3,919,381__  Dated __November 11, 1975__

Inventor(s) __Walter H. Smarook__

It is certified that error appears in the above-identified patent and that said Letters Patent are hereby corrected as shown below:

On the Title Page, and in column 1, lines 1-5, the Title should read --PROCESS FOR EXPANDING A THERMOFORMABLE PREFORM HAVING A NETWORK CONFIGURATION--.

Column 3, in the right hand column of listed polymers, "9" should be aligned with "polysulfone".

Column 4, lines 2-3, --other.-- should be inserted after "each".

Column 6, line 12, "and" should read --the--.

Column 10, line 11, "31" should read --51--.

Column 10, lines 14-15 should read --bers 53a and 53b and lower web members 54a and 54b, respectively. Web--.

Column 10, line 40, "pattern" should read --platen--.

Column 11, line 49, "lether" should read --ether--.

Column 11, line 53, "viniyl" should read --vinyl--.

Column 12, lines 9-10, "low density polyethylene high density polyethylene" should read -- low density polyethylene/high density polyethylene --.

Column 12, line 44, "ech" should read --each--.

Column 13, line 43, "tile" should read --tile,--.

UNITED STATES PATENT OFFICE
CERTIFICATE OF CORRECTION

Patent No. 3,919,381                    Dated November 11, 1975

Inventor(s) Walter H. Smarook

It is certified that error appears in the above-identified patent and that said Letters Patent are hereby corrected as shown below:

Column 14, line 45, in the structure "NR--SiX$_3$" should read --NR—SiX$_3$--.

Column 17, line 49, "Water" should read --Walter--.

Column 17, line 64, "polymethymethacrylate" should read --polymethylmethacrylate--.

Column 22, line 3, "lattic" should read --lattice--.

Column 22, line 35, "havaing" should read --having--.

Signed and Sealed this

Thirtieth Day of November 1976

[SEAL]

Attest:

RUTH C. MASON
Attesting Officer

C. MARSHALL DANN
Commissioner of Patents and Trademarks